(12) United States Patent
Sridharan et al.

(10) Patent No.: US 9,887,760 B1
(45) Date of Patent: Feb. 6, 2018

(54) AMPLITUDE AND PHASE CALIBRATION AT A RECEIVER CHIP IN AN ANTENNA ARRAY

(71) Applicant: MOVANDI CORPORATION, Newport Beach, CA (US)

(72) Inventors: Kartik Sridharan, San Diego, CA (US); Ahmadreza Rofougaran, Newport Beach, CA (US); Michael Boers, South Turramurra (AU); Seunghwan Yoon, Irvine, CA (US); Sam Gharavi, Irvine, CA (US); Donghyup Shin, Irvine, CA (US); Farid Shirinfar, Granada Hills, CA (US); Stephen Wu, Fountain Valley, CA (US); Maryam Rofougaran, Rancho Palos Verdes, CA (US)

(73) Assignee: MOVANDI CORPORATION, Newport Beach, CA (US)

( * ) Notice: Subject to any disclaimer, the term of this patent is extended or adjusted under 35 U.S.C. 154(b) by 0 days.

(21) Appl. No.: 15/587,189

(22) Filed: May 4, 2017

(51) Int. Cl.
*H04B 1/02* (2006.01)
*H04B 7/08* (2006.01)
*H04B 7/06* (2006.01)

(52) U.S. Cl.
CPC ........ *H04B 7/0842* (2013.01); *H04B 7/0617* (2013.01)

(58) Field of Classification Search
CPC ... H04B 7/0842; H04B 7/0656; H04B 7/0617
USPC .......................................................... 455/101
See application file for complete search history.

(56) References Cited

U.S. PATENT DOCUMENTS

| 2006/0007040 A1* | 1/2006 | Kawasaki | H01Q 3/267 342/368 |
| 2011/0134001 A1* | 6/2011 | Sakata | G01R 29/105 343/703 |

* cited by examiner

*Primary Examiner* — Sanh Phu
(74) *Attorney, Agent, or Firm* — Chip Law Group

(57) ABSTRACT

A calibration system, in a receiver chip, receives a plurality of receive signals at a plurality of receive paths. A first receive path and a second receive path is selected for a first receive signal and a second receive signal, respectively. A first signal parameter of the second receive signal is adjusted relative to the first signal parameter of the first receive signal to maximize a first signal strength value of an added signal or minimize a second signal strength value of a subtracted signal. Based on the adjusted first signal parameter, an offset of the first signal parameter is calibrated. Further, based on a matching of the second signal parameter in the second receive path relative to the second signal parameter in the first receive path, value of the second signal parameter is calibrated.

16 Claims, 8 Drawing Sheets

AMPLITUDE AND PHASE CALIBRATION AT A RECEIVER CHIP IN AN ANTENNA ARRAY

CROSS-REFERENCE TO RELATED APPLICATIONS/INCORPORATION BY REFERENCE

This Application makes reference to application Ser. No. 15/587,149, which is filed concurrently herewith.

The above referenced Application is hereby incorporated herein by reference in its entirety.

FIELD OF TECHNOLOGY

Certain embodiments of the disclosure relate to an antenna array in a wireless system. More specifically, certain embodiments of the disclosure relate to a method and system for calibration of a receiver chip in an antenna array.

BACKGROUND

Recent advancements in the field of wireless telecommunication have witnessed various multipath propagation techniques and methods, such as multi-antenna array system, for enhancing capacities of radio channels. Exemplary use cases of the multi-antenna array system are beam forming and beam steering techniques. In accordance with such techniques, a transmitter radiates or steers radio waves in a specific direction by adjusting amplitude and phase of a transmission signal from each of the active antennas of the multi-antenna array system. Likewise, a receiver receives the radio waves via each antenna element from a plane wave in only a selected direction combined coherently.

However, in certain scenarios, receivers may observe a deviation (or offset) in the one or more signal parameters in the signals received via the antenna arrays. The deviation may be the result of, for example, process variation, component mismatch, and/or aging. Such deviation in the one or more signal parameters may result in degraded signal reception. For example, phase error introduces crosstalk between radio channels, while gain mismatch results in imperfect cancellation by an adder. Thus, there is a need for a calibration system that can calibrate one or more signal parameters in the received signals to minimize such deviation (or offset) therein.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for calibration of signal parameters at a receiver chip in an antenna array, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION OF THE DISCLOSURE

Certain embodiments of the disclosure may be found in a method and system for calibration of signal parameters at a receiver chip in an antenna array of a communication device. In the following description, reference is made to the accompanying drawings, which form a part hereof, and in which is shown, by way of illustration, various embodiments of the present disclosure.

Figure 1:
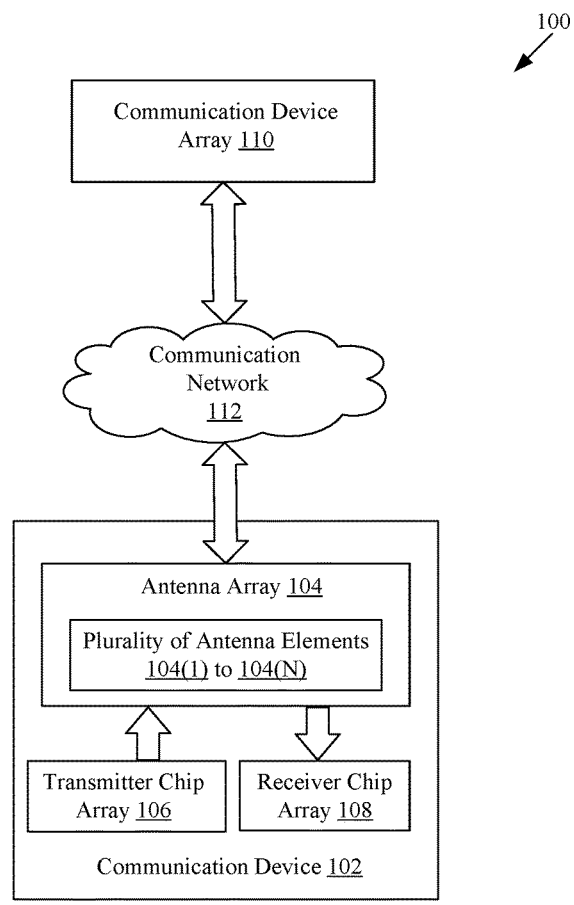
FIG. 1 is a network environment diagram that illustrates an exemplary communication device in communication with other communication devices via a communication network, in accordance with an exemplary embodiment of the disclosure.

FIG. 1 is a network environment diagram that illustrates an exemplary communication device in communication with other communication devices via a communication network, in accordance with an exemplary embodiment of the disclosure. With reference to FIG. 1, there is shown a communication device 102 that may include a plurality of antenna elements 104(1) to 104(N), collectively referred to as an antenna array 104 or steerable antenna array 104, in a network environment 100. The communication device 102 may further include a transmitter chip array 106. The communication device 102 may further include a receiver chip array 108. Various communication devices in a communication device array 110 may communicate amongst each other and the communication device 102 via a communication network 112. Due to "N" antenna in the antenna array 104, the communication device 102 may facilitate "N" transmit paths and "N" receive paths.

The receiver chip array 108 may comprise various circuits, such as a receiver (Rx) radio frequency (RF) frontend, an analog to digital converter (ADC), a low noise amplifier (LNA), and other miscellaneous components, such as filters, mixers, and frequency generators. Likewise, each of the transmitter chip array 106 may comprise various circuits, such as a transmitter (Tx) RF frontend, a digital to analog converter (DAC), a power amplifier (PA), and other miscellaneous components, such as filters (that reject unwanted spectral components) and mixers (that modulates a frequency carrier signal with an oscillator signal). In general, the communication network 112 may be a mobile communication network that facilitates various wireless communication standards, such as, but not limited to, IEEE 802.11n (Wi-Fi), IEEE 802.11ac (Wi-Fi), HSPA+(3G), WiMAX (4G), and Long Term Evolution (4G), 5G, power-line communication for 3-wire installations as part of ITU G.hn standard, and HomePlug AV2 specification. In accordance with an embodiment, the communication network 112 may facilitate extremely high frequency (EHF), which is the band of radio frequencies in the electromagnetic spectrum from 30 to 300 gigahertz. Such radio frequencies have wavelengths from ten to one millimeter, referred to as millimeter wave (mmW).

In accordance with an embodiment, the communication device 102 may be housed and coupled with a base station. Thus, the antenna array 104 in the communication device 102 may also be coupled to the base station. In accordance with another embodiment, the communication device 102 may be coupled with a mobile device.

The antenna array 104 may receive RF signals from the communication network 112. In an exemplary aspect, the antenna array 104 may be integrated in a plurality of antenna modules of the base station or the mobile device. In another exemplary aspect, one or more circuits of the receiver chip array 108 may be integrated in the plurality of antenna modules of the base station or the mobile device. Such integration may, for example, reduce the costs and power consumption of the base station or the mobile device. Further, space needed to house the hardware components of the base station or the mobile device is also reduced.

In accordance with an exemplary embodiment, the receiver chip array 108 may be configured to receive a plurality of output signals, transmitted by a transmitter chip or transmitter chip arrays of one or more communication devices of the communication device array 110, via the communication network 112. The plurality of output signals may correspond to calibrated signals provided by the transmitter chip or transmitter chip arrays of one or more communication devices of the communication device array 110. The receiver chip array 108 may receive the plurality of output signals at a plurality of input interfaces of a plurality of receive paths, via the antenna array 104. A signal source in the receiver chip array 108 may be configured to provide oscillator signal (or a test signal) to the received plurality of output signals. An example of the signal source in the receiver chip array 108 may be a local oscillation generator (LOGEN) that feeds the test source signal at receive paths. Notwithstanding, the disclosure may not be so limited, and other similar components, such as a phase-locked oscillator (PLO), a free-running voltage-controlled oscillator (VCO), or a calibrated signal received from another panel, may also be utilized to provide the test source signal, without deviation from the scope of the disclosure.

It is to be noted that the exemplary embodiment has been described with respect to two output signals, i.e. a first output signal and a second output signal of the plurality of output signals. Notwithstanding, the disclosure is not so limited, and there may be more than two received output signals, without deviation from the scope of the disclosure.

The receiver chip array 108 may be configured to amplify the first output signal and the second output signal of the received plurality of output signals. The receiver chip array 108 may be further configured to select a first receive path and a second receive path from the plurality of receive paths. In an exemplary aspect, the receiver chip array 108 may select the first receive path and the second receive path based on an adjacency criteria. In another exemplary aspect, the receiver chip array 108 may select the first receive path and the second receive path based on, for example, a round-robin criteria.

In accordance with an embodiment, the receiver chip array 108 may be configured to add the first output signal and the second output signal and determine a first signal strength value of the added signal. Accordingly, the receiver chip array 108 may be configured to adjust one or more signal parameters in the second receive path relative to the first receive path until the first signal strength value of the added signal is maximized. In accordance with another embodiment, the receiver chip array 108 may be configured to subtract the first output signal and the second output signal and determine a second signal strength value of the subtracted signal. Accordingly, the receiver chip array 108 may be configured to adjust one or more signal parameters in the second receive path relative to the first receive path until the second signal strength value of the subtracted signal is minimized.

Based on the adjustment, the receiver chip array 108 may be configured to calibrate the one or more signal parameters such that the one or more signal parameters across the first receive path and the second receive path match with each other. Consequently, a final signal may be generated based on the calibration.

In accordance with an embodiment, the plurality of output signals received by the receiver chip array 108 may be generated by a transmitter chip of a communication device of the communication device array 110. The transmitter chip may be configured to generate the plurality of output signals with calibrated offset value of a first signal parameter and a calibrated value of a second signal parameter. In accordance with an exemplary embodiment, the transmitter chip may calibrate the one or more signal parameters at transmit paths based on an intra-chip calibration system. In accordance with the intra-chip calibration system, the transmit paths may be calibrated to provide one or more matched signal parameters, such as phase and amplitude (or gain), across various transmit paths in the transmitter chip.

In accordance with another embodiment, the plurality of output signals received by the receiver chip array 108 may be generated by a transmitter chip array of a communication device of the communication device array 110. A transmitter chip, calibrated against other transmitter chips in the transmitter chip array, may be configured to generate the plurality of output signals with calibrated offset value of a first signal parameter and a calibrated value of a second signal parameter. In accordance with an exemplary embodiment, the transmitter chip may calibrate the one or more signal parameters at transmit paths based on an inter-chip calibration system. In accordance with the inter-chip calibration system, the transmit paths may be calibrated to provide one or more matched signal parameters, such as phase and amplitude (or gain), across various transmit paths in the transmitter chip, based on one or more output signals received from other transmitter chips in the transmitter array.

The inter-chip or intra-chip calibration may correct a relative error or relative deviation between values of the one or more signal parameters along each of the transmit paths in the transmitter chip. The correction of the relative error or relative deviation may be performed based on an appropriate adjustment in the values of the one or more signal parameters in a specified pattern. Accordingly, the relative error or relative deviation between values of the one or more signal parameters may be corrected to yield matched values of the one or more signal parameters, across the plurality of transmit paths, in order to allow for beam forming techniques.

In accordance with an embodiment, in case the communication device 102 comprises additional receiver chips other than the receiver chip array 108, signal-to-noise ratio (SNR) information may be accessed from a baseband (BB) chip to adjust the one or more signal parameters, such as phase value and amplitude value, for chip-to-chip calibration. In such a case, no additional RF support, such as a signal strength indicator (SSI) or a received signal strength indicator (RSSI), may be required.

Figure 2:
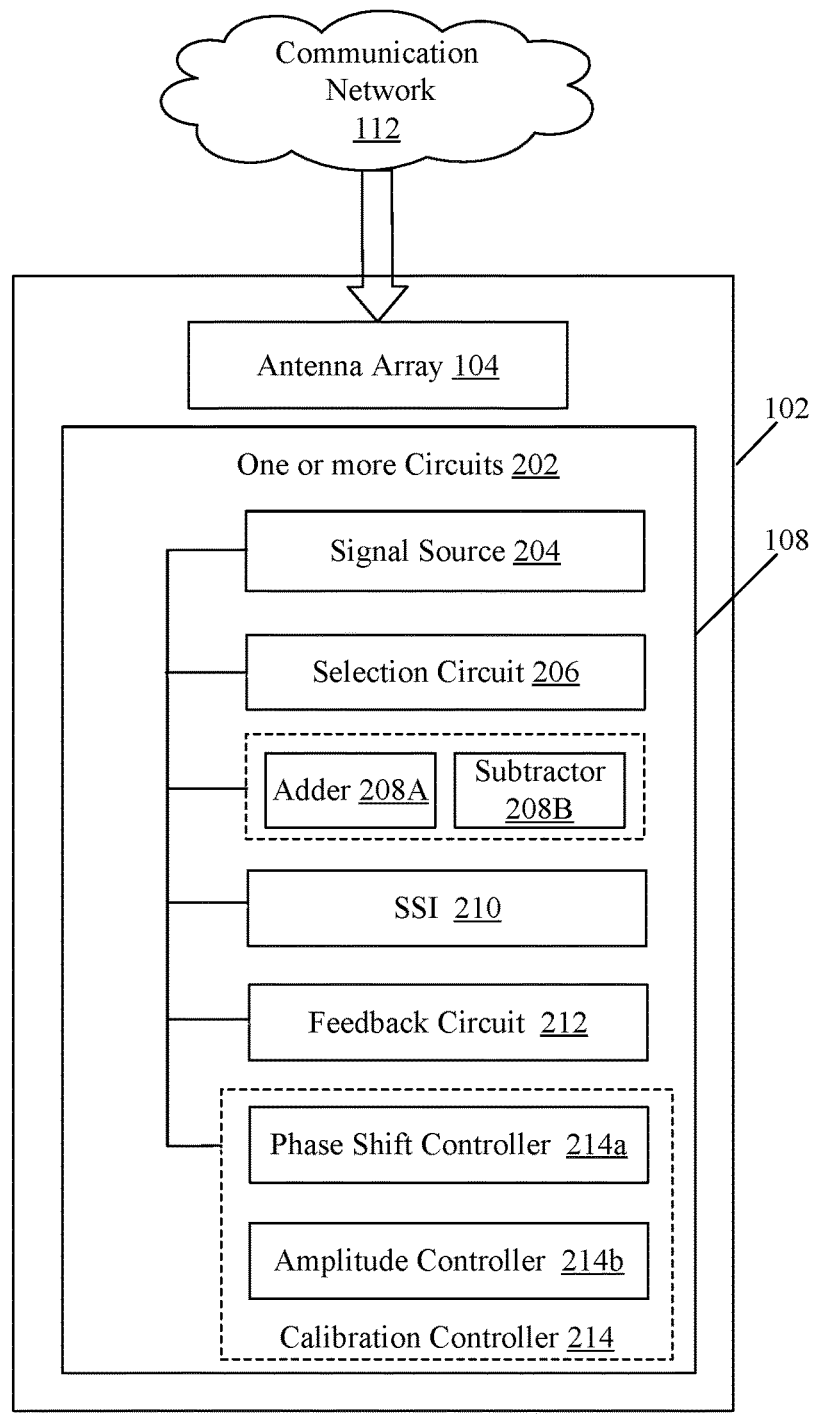
FIG. 2 depicts a block diagram illustrating various components of a receiver chip in an exemplary communication device, in accordance with an exemplary embodiment of the disclosure.

FIG. 2 depicts a block diagram illustrating various components of receiver chip in an exemplary communication device, in accordance with an exemplary embodiment of the disclosure. With reference to FIG. 2, there is shown the receiver chip array 108 in the communication device 102. The receiver chip array 108 may include one or more circuits 202. The one or more circuits 202 may further include a signal source 204, a selection circuit 206, an adder 208A or a subtractor 208B, an SSI 210, a feedback circuit 212, and a calibration controller 214. The calibration controller 214 may further include a phase shift controller 214a and an amplitude controller 214b.

The one or more circuits 202 may be configured to calibrate one or more signal parameters in order to provide defined signal parameters between at least two of the plurality of receive paths. The plurality of receive paths may be associated with the plurality of antenna elements 104(1) to 104(N) of the antenna array 104. Such calibration allows a correction of an offset (or deviation) of the one or more signal parameters accumulated along individual receive paths of the plurality of antenna elements 104(1) to 104(N). Based on such calibration, the one or more signal parameters may be matched across the plurality of receive paths in the receiver chip array 108. In accordance with an embodiment, the one or more circuits 202 may be integrated in a package of a plurality of antenna modules. In accordance with another embodiment, the one or more circuits 202 may be on a printed circuit board on which the plurality of antenna modules are mounted.

In accordance with an exemplary embodiment, the plurality of antenna elements of the antenna array 104 may be configured to receive the plurality of receive signals (i.e. the output signals), via the communication network 112. The plurality of receive signals may be provided by one or more transmitter chips of the other communication device arrays. Each of the plurality of receive signals may be associated with corresponding one or more signal parameters. Examples of such one or more signal parameters may include, but are not limited to, phase and amplitude (or gain).

In accordance with an embodiment, one or more input interfaces (not shown) of the receiver chip array 108 may be configured to receive the plurality of receive signals from the antenna array 104. In accordance with an embodiment, the one or more circuits 202 may optionally include a plurality of duplex filters. An optional duplex filter may be connected between an antenna element and a receive path of the plurality of receive paths. The optional duplex filter may allow either a receive signal received from an antenna element of the plurality of antenna elements along to the receive path or accept a transmit signal over a transmission path generated by one of a plurality of transmitter chips in the transmitter chip array 106.

The signal source 204 in the one or more circuits 202 may be configured to provide test signals to the plurality of receive signals at each of the plurality of receive paths. The plurality of receive signals are communicated to a plurality of LNAs (not shown) in the one or more circuits 202. At each receive path, corresponding LNA amplifies the receive signal on the receive path to generate a corresponding amplified receive signal, hereinafter referred to as the receive signal. The one or more circuits 202 may optionally include a band pass filter that may be located at an output of the LNA in order to remove out-of-band signals from the amplified receive signal.

The selection circuit 206 of the one or more circuits 202 may be configured to select a first receive path (for a first receive signal) and a second receive path (for a second receive signal) from a plurality of receive paths within the receiver chip array 108. In accordance with an embodiment, during the first iteration, the selection circuit 206 may select the first receive path and the second receive path based on an adjacency criteria. In accordance with another embodiment, i.e. during the subsequent iterations, the selection circuit 206 may select the first receive path and the second receive path based on, for example, a round-robin criteria. The first receive signal and the second receive signal may be communicated to the adder 208A or the subtractor 208B by the selection circuit 206.

In accordance with an embodiment, the adder 208A of the one or more circuits 202 may be configured to add the first receive signal and the second receive signal and generate an added signal. In accordance with an embodiment, the adder 208A may be of active current-mode type. In accordance with another embodiment, the adder 208A may be of passive type. The adder 208A may be configured to communicate the added signal to the SSI 210. The SSI 210 may be configured to indicate the first signal strength value of the added signal. In accordance with another embodiment, the subtractor 208B may be configured to subtract the first receive signal and the second receive signal and generate a subtracted signal. The subtractor 208B may be configured to communicate the subtracted signal to the SSI 210. The SSI 210 may be configured to indicate the second signal strength value of the subtracted signal.

The feedback circuit 212 may be configured to determine a feedback signal based on the indicated first or second signal strength value and communicate the feedback signal to the calibration controller 214. It may be noted that in case the first receive signal and the second receive signal are already added at the I/Q output or at any point in the receive chain, an additional adder may not be required in the receiver chip array 108.

The phase shift controller 214a in the calibration controller 214 may be configured to adjust a first signal parameter, i.e. the phase, of the second receive signal relative to the first signal parameter of the first receive signal. In accordance with an embodiment, the phase shift controller 214a may perform the adjustment in the phase value of the second receive signal until the first signal strength value of the added signal is maximized. The SSI 210 may be configured to indicate the maximized first signal strength value of the added signal. In accordance with an embodiment, the phase shift controller 214a may perform the adjustment in the phase value of the second receive signal until the second signal strength value of the subtracted signal is minimized. The SSI 210 may be configured to indicate the minimized second signal strength value of the subtracted signal. Such an adjustment of the first signal parameter of the second receive signal may be independent of the value of the second signal parameter.

Further, the amplitude controller 214*b* in the calibration controller 214 may be configured to independently activate the first receive path and the second receive path. The amplitude controller 214*b* may be further configured to adjust the second signal parameter, i.e. the amplitude, of the second receive signal until the second signal parameter of the second receive signal matches the second signal parameter of the first receive signal.

The calibration controller 214 of the one or more circuits 202 may be configured to calibrate an offset of the first signal parameter based on the adjusted first signal parameter of the second receive signal. The calibration controller 214 may be further configured to calibrate a value of a second signal parameter based on the matching of the second signal parameter of the second receive signal relative to the second signal parameter of the first receive signal.

The one or more circuits 202 may be configured to generate a final signal with the calibrated offset of the first signal parameter and the calibrated value of the second signal parameter. The ADC in the one or more circuits 202 may be further configured to convert the waveform of the generated final signal from analog format to digital format. The one or more circuits 202 may be configured to communicate the final signal to a central base band processing unit (not shown) in the communication device 102. The central base band processing unit may be configured to impose one or more digital signal processing techniques, such as filtering, to the final signal. In accordance with an embodiment, central base band processing unit may communicate the processed final signal in the base band to a base station (not shown) coupled with the communication device 102. In accordance with an embodiment, the central base band processing unit may communicate the processed final signal to a mobile device coupled with the communication device 102.

Figure 3A:
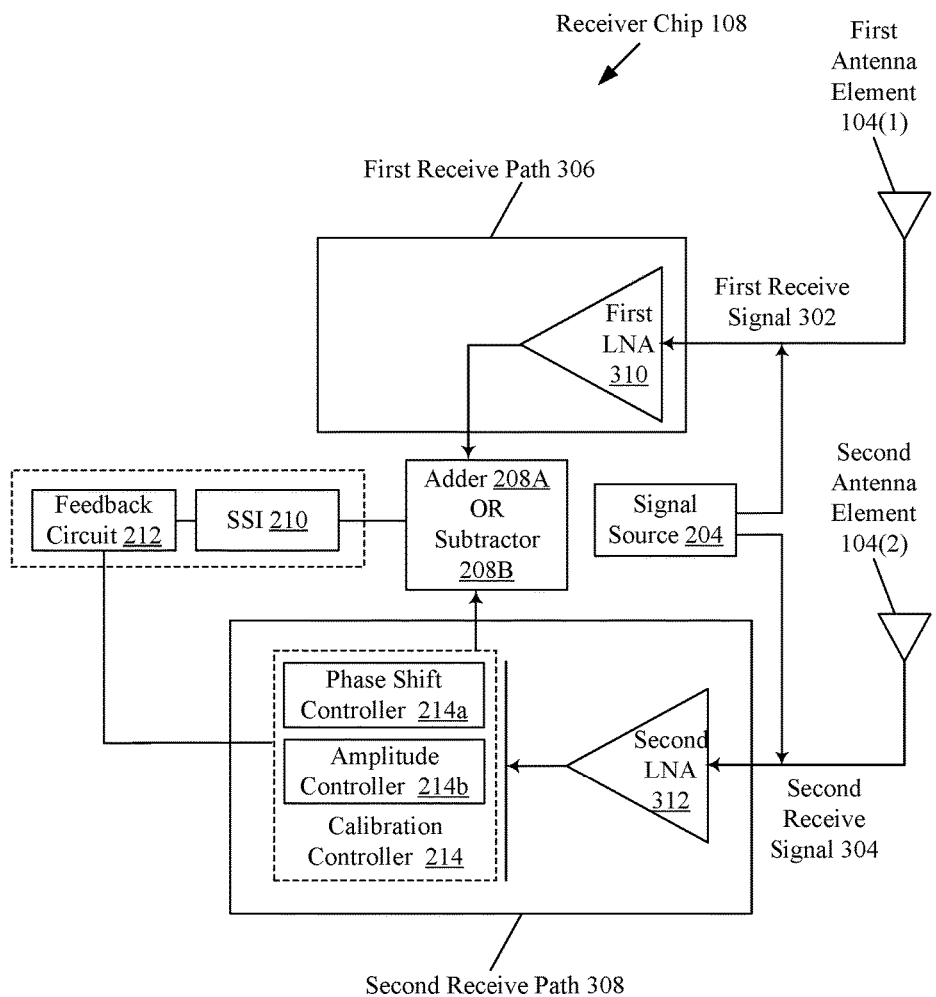
FIG. 3A depicts an exemplary scenario for calibration of signal parameters at a receiver chip, in accordance with an exemplary embodiment of the disclosure.
Figure 3B:
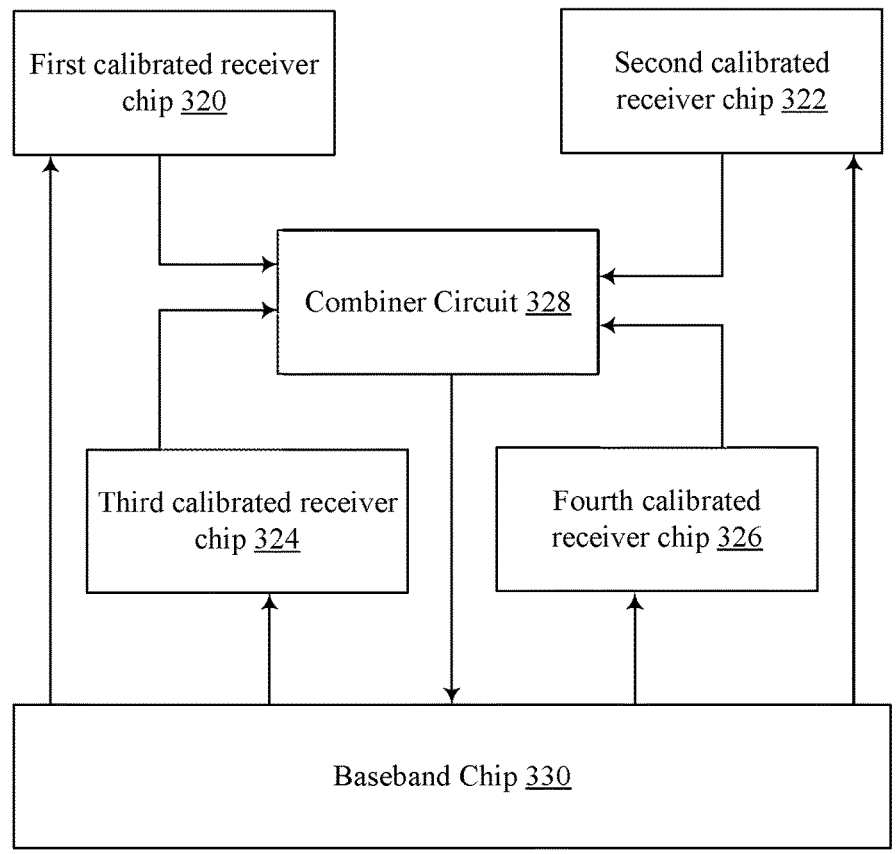
FIG. 3B depicts another exemplary scenario for calibration of signal parameters of a plurality of receiver chips, in accordance with an exemplary embodiment of the disclosure.

In accordance with an embodiment, as described in detail in FIG. 3B, in case the communication device 102 comprises additional receiver chips other than the receiver chip array 108, SNR information may be accessed from a BB chip to adjust the one or more signal parameters, such as phase value and amplitude value, for chip-to-chip calibration. In such a case, no RF (SSI or RSSI) support may be required to measure the signal strength value.

FIG. 3A depicts an exemplary scenario for calibration of signal parameters at a receiver chip (or intra-chip calibration), in accordance with an exemplary embodiment of the disclosure. With reference to FIG. 3A, there is shown a first receive signal 302, a second receive signal 304, a first receive path 306, a second receive path 308, a first LNA 310, a second LNA 312, a first antenna element 104(1), and a second antenna element 104(2) in the block diagram of the receiver chip array 108. There is further shown the signal source 204, the SSI 210, the feedback circuit 212, and the calibration controller 214, as described in FIG. 2. It may be noted that for brevity, only two receive signals, two receive paths, two LNAs, and two antenna elements in the receiver chip array 108 have been discussed. Notwithstanding, the disclosure is not so limited, and there may be more than two receive signals, two receive paths, two LNAs, and two antenna elements, without deviation from the scope of the disclosure.

With reference to FIG. 3A, the first antenna element 104(1) and the second antenna element 104(2) of the antenna array 104 may be configured to receive the first receive signal 302 and the second receive signal 304, respectively, of the plurality of receive signals, via the communication network 112. A first input interface and a second input interface of the one or more input interfaces (not shown) of the receiver chip array 108 may be configured to receive the first receive signal 302 and the second receive signal 304 from the first antenna element 104(1) and the second antenna element 104(2), respectively.

The signal source 204 may be configured to provide an oscillator signal (or a test signal) to the first receive path 306 and the second receive path 308 of the plurality of receive paths. The first LNA 310 and the second LNA 312 may be connected in the first receive path 306 and the second receive path 308, respectively. The first LNA 310 and the second LNA 312 amplify the first receive signal 302 and the second receive signal 304 received on the first receive path 306 and the second receive path to produce amplified first receive signal and amplified second receive signal.

The selection circuit 206 selects the first receive path 306 for the first receive signal 302 and the second receive path 308 for the second receive signal 304. In the first iteration, the selection circuit 206 selects the first receive path 306 and the second receive path 308 based on an adjacency criteria. In other words, the first receive path 306 and the second receive path 308 are selected by the selection circuit 206 in the first instance as the first receive path 306 and the second receive path 308 are adjacent with respect to each other. Thereafter, the selection circuit 206 communicates the first receive signal 302 and the second receive signal 304 to the adder 208A or the subtractor 208B. In accordance with an embodiment, the adder 208A adds the first receive signal 302 and the second receive signal 304 and generates an added signal. The added signal is communicated to the SSI 210. The SSI 210 indicates the first signal strength value of the added signal. In accordance with another embodiment, the subtractor 208B subtracts the first receive signal 302 and the second receive signal 304 and generates a subtracted signal. The subtracted signal is communicated to the SSI 210. The SSI 210 indicates the second signal strength value of the subtracted signal.

The feedback circuit 212 provides the feedback signal to the calibration controller 214 based on the first or the second signal strength value of the added or subtracted signal indicated by the SSI 210. The phase shift controller 214*a* in the calibration controller 214 adjusts the phase value of the second receive signal 304 relative to the phase value of the first receive signal 302. In accordance with an embodiment, the phase shift controller 214*a* performs the adjustment until the first signal strength value of the added signal is maximized, as indicated by the SSI 210. In accordance with another embodiment, the phase shift controller 214*a* performs the adjustment until the second signal strength value of the subtracted signal is minimized, as indicated by the SSI 210.

Further, the amplitude controller 214*b* independently activates the first receive path 306 and the second receive path 308. The amplitude controller 214*b* further adjusts the amplitude value of the second receive signal 304 until the value matches the amplitude value of the first receive signal 302.

Accordingly, the calibration controller 214 calibrates an offset of the phase value based on the adjusted phase value of the second receive signal 304. The calibration controller 214 further calibrates the amplitude value of the second receive signal 304, based on the matching of the amplitude value of the second receive signal 304 relative to the amplitude value of the first receive signal 302.

In the subsequent next iterations, the selection circuit 206 selects next receive paths, such as a third receive path (not shown) and the second receive path 308 based on, for example, a round-robin criteria. Subsequent steps to calibrate a third receive signal with respect to the second receive signal 304 are same as discussed above. Thus, at the end of the last iteration, the phase value and the amplitude value, are calibrated across the plurality of receive paths and thus, match with each other, which may include the phase value and the amplitude value falling within an acceptable range.

Lastly, one of the one or more circuits 202 generates a final signal with the calibrated offset of the first signal parameter and the calibrated value of the second signal parameter. The waveform of the generated final signal is converted from analog format to digital format. The final signal is communicated to a central base band processing unit (not shown) in the communication device 102.

FIG. 3B depicts another exemplary scenario for calibration of signal parameters of a plurality of receiver chips (or inter-chip calibration), in accordance with an exemplary embodiment of the disclosure. With reference to FIG. 3B, there is shown a plurality of calibrated receiver chips, such as the first calibrated receiver chip 320, a second calibrated receiver chip 322, a third calibrated receiver chip 324, and a fourth calibrated receiver chip 326. There is further shown a combiner circuit 328 and a BB chip 330 in the communication device 102. The components and functionality of the first calibrated receiver chip 320, the second calibrated receiver chip 322, the third calibrated receiver chip 324, and the fourth calibrated receiver chip 326 may be same as the receiver chip array 108, described in detail in FIGS. 1 to 3A. Thus, each of the plurality of calibrated receiver chips may be configured to generate a final signal based on a calibrated offset of a first signal parameter and a calibrated value of a second signal parameter in the corresponding calibrated receiver chip. It may be noted that for brevity, the exemplary scenario for chip-to-chip calibration has been described with respect to only four calibrated receiver chips. Notwithstanding, the disclosure is not so limited, and there may be two or more calibrated receiver chips utilized to realize the chip-to-chip calibration, without deviation from the scope of the disclosure.

With reference to FIG. 3B, the first calibrated receiver chip 320, a second calibrated receiver chip 322, a third calibrated receiver chip 324, and a fourth calibrated receiver chip 326 are the same, however, there may be an offset between the final signals generated by the first calibrated receiver chip 320, a second calibrated receiver chip 322, a third calibrated receiver chip 324, and a fourth calibrated receiver chip 326. Such difference may be referred to as a group difference. Each of the plurality of calibrated receiver chips may be configured to provide respective generated final signal to the combiner circuit 328. The combiner circuit 328 may be configured to generate a combined signal that corresponds to the plurality of final signals generated by the plurality of calibrated receiver chips. The BB chip 330 may comprise one or more circuits configured to determine an SNR information based on the combined plurality of final signals. Accordingly, an offset between at least two of the plurality of calibrated receiver chips may be determined based on the determined SNR information. Such two of the plurality of calibrated receiver chips may be selected based on a round-robin criteria. For example, a first offset may be determined between the first calibrated receiver chip 320 and the second calibrated receiver chip 322, a second offset may be determined between the second calibrated receiver chip 322 and the third calibrated receiver chip 324, and a third offset may be determined between the third calibrated receiver chip 324 and the fourth calibrated receiver chip 326. Based on the determined offsets, the BB chip 330 may be further configured to adjust the one or more signal parameters, such as the amplitude gains and the phase values, in the plurality of calibrated receiver chips until the SNR information is maximized. The SNR information may be maximized when the one or more signal parameters match with each other. The exemplary operations described herein may be performed on a RF signal that is received in real time.

Figure 4:
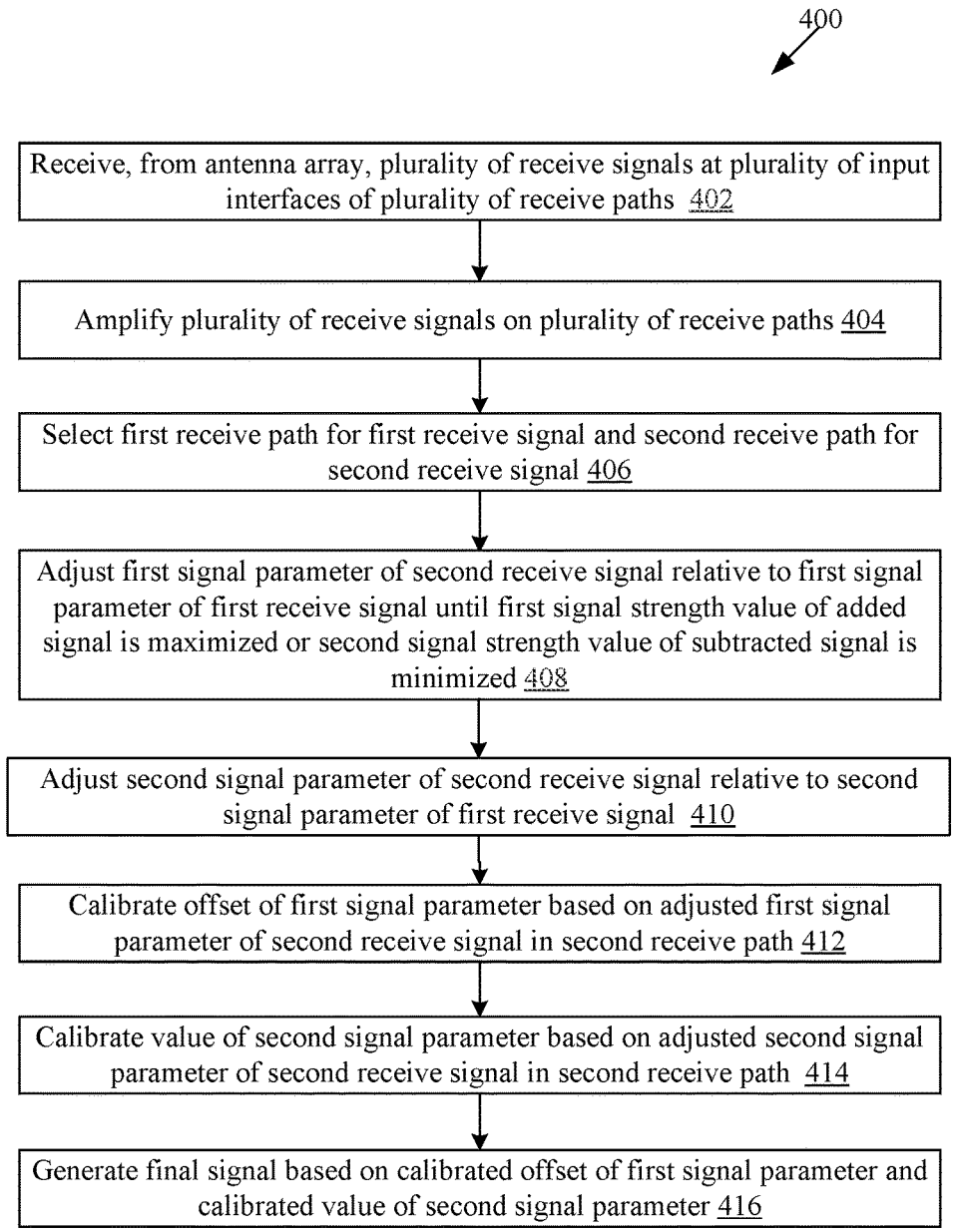
FIG. 4 depicts a flow chart illustrating exemplary operations for calibration of signal parameters at a receiver chip of FIGS. 1 and 2, in accordance with an exemplary embodiment of the disclosure.

FIG. 4 depicts a flow chart illustrating exemplary operations for intra-chip calibration of signal parameters at a transmitter chip FIGS. 1 to 3B, in accordance with an exemplary embodiment of the disclosure. Referring to FIG. 4, there is shown a flow chart 400 comprising exemplary operations 402 through 416.

At 402, a plurality of receive signals at a plurality of input interfaces of a plurality of receive paths may be received from the antenna array 104. The one or more circuits 202 may be configured to receive the plurality of receive signals, such as the first receive signal 302 and the second receive signal 304, at a plurality of input interfaces, such as a first input interface and a second input interface, from the antenna array 104, such as the first antenna element 104(1) and the second antenna element 104(2). The first input interface and the second input interface may communicate the received plurality of receive signals, such as the first receive signal 302 and the second receive signal 304, to a plurality of receive paths, such as the first receive path 306 and the second receive path 308.

In accordance with an embodiment, the plurality of antenna elements 104(1) to 104(N) of the antenna array 104 may be integrated in a plurality of antenna modules. In accordance with an embodiment, the one or more circuits 202 may be integrated in the plurality of antenna modules. In accordance with an embodiment, the one or more circuits 202 may be integrated in a package of the plurality of antenna modules. In accordance with an embodiment, the one or more circuits 202 may be on a printed circuit board on which the plurality of antenna modules are mounted.

At 404, the plurality of receive signals received on the plurality of receive paths may be amplified. The plurality of LNAs, such as the first LNA 310 and the second LNA 312, connected in each of the plurality of receive paths, such as the first receive path 306 and the second receive path 308, may be configured to amplify the plurality of receive signals, such as the first receive signal 302 and the second receive signal 304, received on the first receive path 306 and the second receive path 308, respectively.

At 406, the first receive path 306 for the first receive signal 302 and the second receive path 308 for the second receive signal 304 may be selected from the plurality of receive paths within the receiver chip array 108. In accordance with an embodiment, during the first iteration, the selection circuit 206 may select the first receive path 306 and the second receive path 308 based on an adjacency criteria. In accordance with another embodiment, i.e. during the subsequent iterations, the selection circuit 206 may select the second receive path 308 and a third receive path (not shown) based on, for example, a round-robin criteria.

In accordance with an embodiment, the adder 208A of the one or more circuits 202 may be configured to add the first receive signal 302 and the second receive signal 304 and generate an added signal. The adder 208A may be configured to communicate the added signal to the SSI 210. The SSI 210 may be configured to indicate the first signal strength value of the added signal. In accordance with another embodiment, the subtractor 208B of the one or more circuits 202 may be configured to subtract the first receive signal 302 and the second receive signal 304 and generate a subtracted signal. The subtractor 208B may be configured to communicate the subtracted signal to the SSI 210. The SSI 210 may be configured to indicate the second signal strength value of the subtracted signal. The feedback circuit 212 may be configured to determine a feedback signal and communicate the feedback signal to the calibration controller 214.

At 408, a first signal parameter of the second receive signal relative to the first signal parameter of the first receive signal may be adjusted. The phase shift controller 214a in the calibration controller 214 may be configured to adjust the first signal parameter, i.e. the phase, of the second receive signal 304 relative to the first signal parameter of the first receive signal 302. In accordance with an embodiment, the phase shift controller 214a may perform the adjustment in the phase value of the second receive signal 304 until the first signal strength value of the added signal is maximized. The SSI 210 may be configured to indicate the maximized first signal strength value of the added signal. In accordance with an embodiment, the phase shift controller 214a may perform the adjustment in the phase value of the second receive signal 304 until the second signal strength value of the subtracted signal is minimized. The SSI 210 may be configured to indicate the minimized second signal strength value of the subtracted signal. Such an adjustment of the first signal parameter of the second receive signal 304 may be independent of the value of the second signal parameter.

At 410, the second signal parameter, i.e. the amplitude, of the second receive signal 304 may be adjusted. The amplitude controller 214b in the calibration controller 214 may be configured to adjust the second signal parameter, i.e. the amplitude, of the second receive signal 304 until the second signal parameter of the second receive signal 304 matches the second signal parameter of the first receive signal 302. Further, the amplitude controller 214b in the calibration controller 214 may be configured to independently activate the first receive path and the second receive path. It may be noted that the adjustment of the first signal parameter of the second receive signal 304 may be independent of the adjustment of the value of the second signal parameter of the second receive signal 304. Thus, the sequence of adjustment, discussed in 410 and 412, may be interchangeable, without deviation from the scope of the disclosure.

At 412, an offset of the first signal parameter may be calibrated based on the adjusted first signal parameter of the second receive signal in the second receive path. The calibration controller 214 of the one or more circuits 202 may be configured to calibrate the offset of the first signal parameter based on the adjusted first signal parameter of the second receive signal 304 in the second receive path 308.

At 414, a value of a second signal parameter may be calibrated. The calibration controller 214 may be further configured to calibrate a value of a second signal parameter based on a matching of the second signal parameter in the second receive path 308 relative to the second signal parameter in the first receive path 306.

At 416, a final signal may be generated based on the calibrated offset of the first signal parameter and the calibrated value of the second signal parameter. The one or more circuits 202 may be configured to generate the final signal with the calibrated offset of the first signal parameter and the calibrated value of the second signal parameter.

Figure 5A:
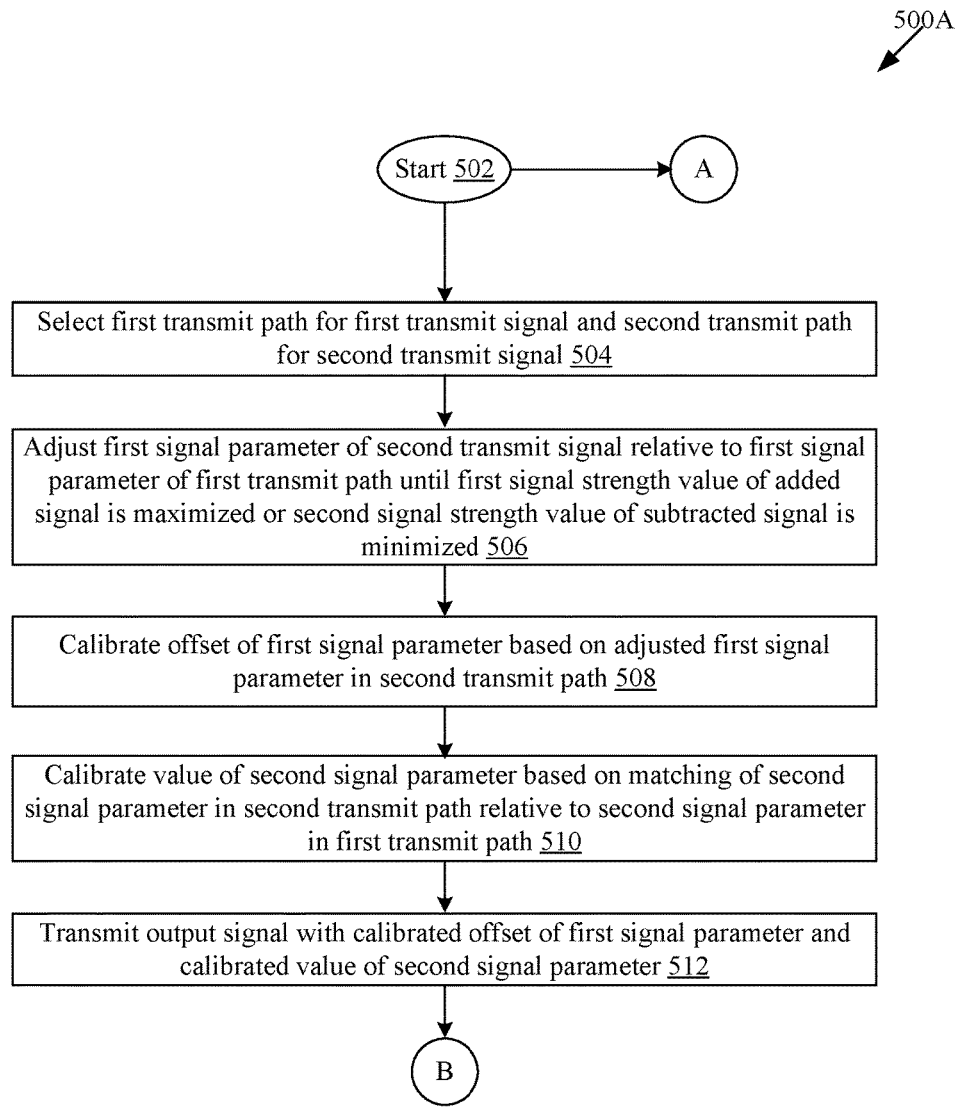
FIGS. 5A and 5B, collectively, depict a flow chart illustrating exemplary operations for an overall calibration system of signal parameters in an antenna array, in accordance with an exemplary embodiment of the disclosure.
Figure 5B:
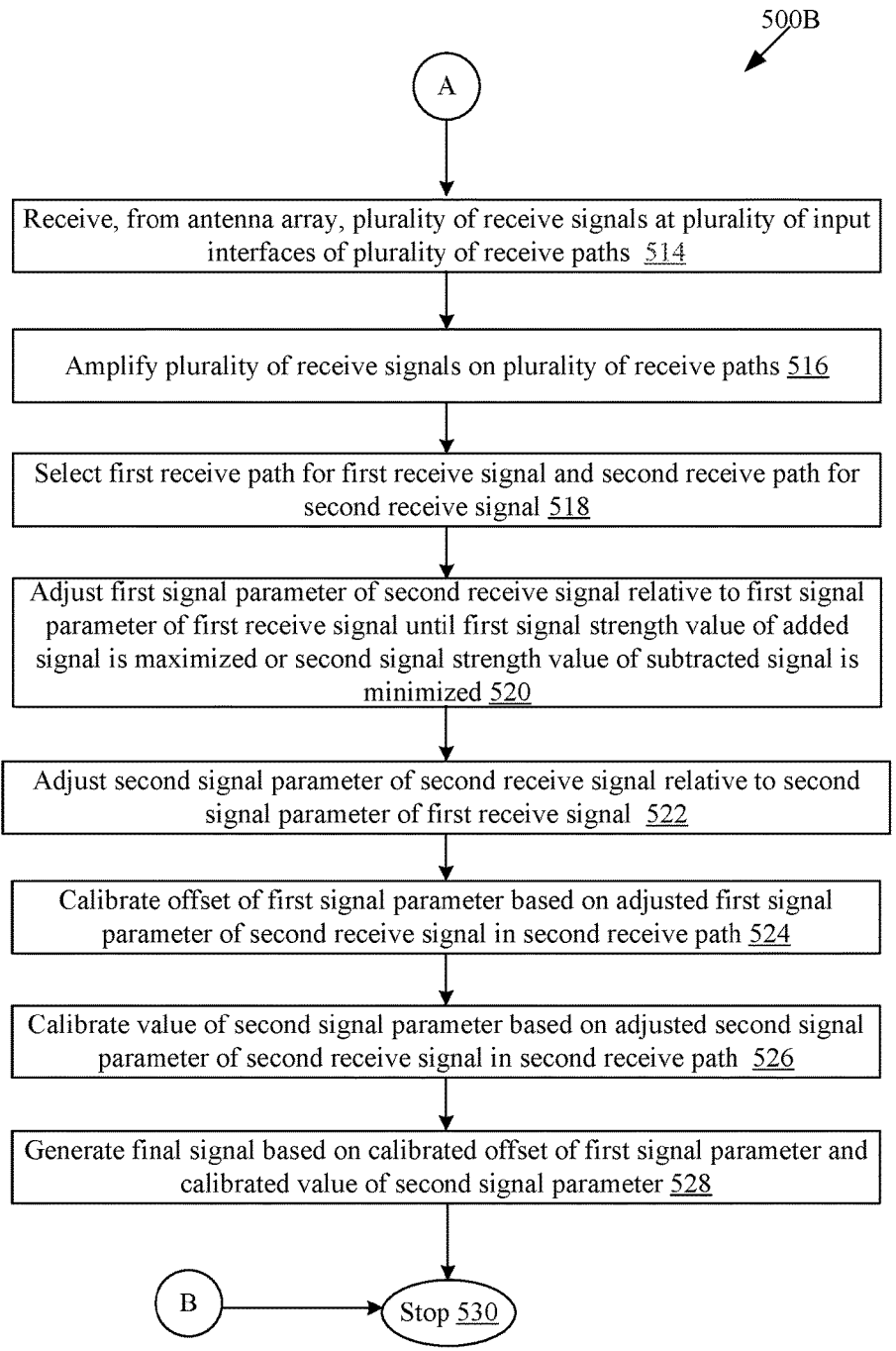

FIGS. 5A and 5B, collectively, depict a flow chart illustrating exemplary operations for an overall calibration system of signal parameters in an antenna array, in accordance with an exemplary embodiment of the disclosure. Referring to FIGS. 5A and 5B, there are shown flow charts 500A and 500B that start at 502 and ends at 530. The control simultaneously passes to 504 and 514 from 502. Thus, the first set of exemplary operations indicated by 504 to 512, and the second set of exemplary operations indicated by 514 to 528 are executed in parallel. In accordance with an embodiment, the two set of exemplary operations may be executed in a sequence, without deviation from the scope of the disclosure.

At 504, a first transmit path (for a first transmit signal) and a second transmit path (for a second transmit signal) may be selected from a plurality of transmit paths within a transmitter chip of a communication device from the communication device array 110. In accordance with an embodiment, during the first iteration, a selection circuit of the transmitter chip may be configured to select a first transmit path and a second transmit path based on an adjacency criteria. However, in accordance with another embodiment, i.e. during subsequent iterations, the selection circuit of the transmitter chip may be configured to select the first transmit path and the second transmit path based on, for example, a round-robin criteria.

At 506, a first signal parameter of the second transmit signal may be adjusted relative to the first signal parameter of the first transmit signal. A phase shift controller of the transmitter chip may be configured to adjust the first signal parameter of the second transmit signal relative to the first signal parameter of the first transmit signal.

Prior to adjustment, in accordance with an embodiment, an adder in the transmitter chip may be configured to add the first transmit signal and the second transmit signal and communicate the added signal to a TSSI of the transmitter chip. The TSSI may be configured to indicate a signal strength value of the added signal. In accordance with another embodiment, a subtractor in the transmitter chip may be configured to subtract the first transmit signal and the second transmit signal and communicate the subtracted signal to a TSSI of the transmitter chip. The TSSI may be configured to indicate a signal strength value of the subtracted signal.

A feedback circuit of the transmitter chip provides a feedback signal to a calibration controller in the transmitter chip. A phase shift controller adjusts the first signal parameter, i.e. phase value, of the second transmit signal relative to the first signal parameter, i.e. the phase value, of the first transmit signal until the signal strength value of the added signal is maximized or the subtracted signal is minimized.

At 508, an offset of the first signal parameter may be calibrated based on the adjusted first signal parameter of the second transmit signal. In accordance with an embodiment, the calibration controller may be configured to calibrate the offset of the first signal parameter based on the adjusted first signal parameter of the second transmit signal based on the adjusted first signal parameter of the second transmit signal.

At 510, a value of a second signal parameter may be calibrated based on the matching of the second signal parameter of the second transmit signal relative to the second signal parameter of the first transmit signal. The calibration controller may be further configured to calibrate a value of a second signal parameter based on the matching of the second signal parameter of the second transmit signal relative to the second signal parameter of the first transmit signal.

Prior to the calibration of the value of the second signal parameter, an amplitude controller in the transmitter chip may be configured to adjust the second signal parameter of the second transmit signal until the second signal parameter of the second receive signal matches the second signal parameter of the first receive signal.

At 512, an output signal with the calibrated offset of the first signal parameter and the calibrated value of the second signal parameter may be transmitted, via an antenna array in the communication device, to the communication network 112. The transmitter chip may be configured to transmit the output signal with the calibrated offset of the first signal parameter and the calibrated value of the second signal parameter. The control passes to 530.

At 514, a plurality of output signals, similar to the output signal generated at 512 but transmitted by other transmitter chips, may be received at a plurality of input interfaces. The one or more circuits 202 may be configured to receive the plurality of receive signals, such as the first receive signal 302 and the second receive signal 304, at the plurality of input interfaces, such as a first input interface and a second input interface, from the antenna array 104, such as the first antenna element 104(1) and the second antenna element 104(2). The first input interface and the second input interface may communicate the received plurality of receive signals, such as the first receive signal 302 and the second receive signal 304, to a plurality of receive paths, such as the first receive path 306 and the second receive path 308. A plurality of duplex filters, such as a first duplex filter and a second duplex filter, allows the plurality of receive signals, such as the first receive signal 302 and the second receive signal 304, received from the antenna array 104, such as the first antenna element 104(1) and the second antenna element 104(2).

In accordance with an embodiment, the plurality of antenna elements 104(1) to 104(N) of the antenna array 104 may be integrated in a plurality of antenna modules. In accordance with an embodiment, the one or more circuits 202 may be integrated in the plurality of antenna modules. In accordance with an embodiment, the one or more circuits 202 may be integrated in a package of the plurality of antenna modules. In accordance with an embodiment, the one or more circuits 202 may be on a printed circuit board on which the plurality of antenna modules are mounted.

At 516, the plurality of receive signals received on the plurality of receive paths may be amplified. The plurality of LNAs, such as the first LNA 310 and the second LNA 312, connected in each of the plurality of receive paths, such as the first receive path 306 and the second receive path 308, may be configured to amplify the plurality of receive signals received on the first receive path 306 and the second receive path 308.

At 518, the first receive path 306 for the first receive signal 302 and the second receive path 308 for the second receive signal 304 may be selected from the plurality of receive paths within the receiver chip array 108. In accordance with an embodiment, during the first iteration, the selection circuit 206 may select the first receive path 306 and the second receive path 308 based on an adjacency criteria. In accordance with another embodiment, i.e. during the subsequent iterations, the selection circuit 206 may select the second receive path 308 and a third receive path (not shown) based on, for example, a round-robin criteria.

In accordance with an embodiment, the adder 208A of the one or more circuits 202 may be configured to add the first receive signal 302 and the second receive signal 304 and generate an added signal. The adder 208A may be configured to communicate the added signal to the SSI 210. The SSI 210 may be configured to indicate the first signal strength value of the added signal. In accordance with another embodiment, the subtractor 208B of the one or more circuits 202 may be configured to subtract the first receive signal 302 and the second receive signal 304 and generate a subtracted signal. The subtractor 208B may be configured to communicate the subtracted signal to the SSI 210. The SSI 210 may be configured to indicate the second signal strength value of the subtracted signal. The feedback circuit 212 may be configured to determine a feedback signal and communicate the feedback signal to the calibration controller 214.

At 520, a first signal parameter of the second receive signal relative to the first signal parameter of the first receive signal may be adjusted. The phase shift controller 214a in the calibration controller 214 may be configured to adjust the first signal parameter, i.e. the phase, of the second receive signal 304 relative to the first signal parameter of the first receive signal 302. In accordance with an embodiment, the phase shift controller 214a may perform the adjustment in the phase value of the second receive signal 304 until the first signal strength value of the added signal is maximized. The SSI 210 may be configured to indicate the maximized first signal strength value of the added signal. In accordance with another embodiment, the phase shift controller 214a may perform the adjustment in the phase value of the second receive signal 304 until the second signal strength value of the subtracted signal is minimized. The SSI 210 may be configured to indicate the minimized second signal strength value of the subtracted signal. Such an adjustment of the first signal parameter of the second receive signal 304 may be independent of the value of the second signal parameter.

At 522, the second signal parameter, i.e. the amplitude, of the second receive signal 304 may be adjusted. The amplitude controller 214b in the calibration controller 214 may be configured to adjust the second signal parameter, i.e. the amplitude, of the second receive signal 304 until the second signal parameter of the second receive signal 304 matches the second signal parameter of the first receive signal 302. Further, the amplitude controller 214b in the calibration controller 214 may be configured to independently activate the first receive path and the second receive path. It may be noted that the adjustment of the first signal parameter of the second receive signal 304 may be independent of the adjustment of the value of the second signal parameter of the second receive signal 304. Thus, the sequence of adjustment, discussed in 522 and 524, may be interchangeable, without deviation from the scope of the disclosure.

At 524, an offset of the first signal parameter may be calibrated based on the adjusted first signal parameter of the second receive signal in the second receive path. The calibration controller 214 of the one or more circuits 202 may be configured to calibrate the offset of the first signal parameter based on the adjusted first signal parameter of the second receive signal 304 in the second receive path 308.

At 526, a value of a second signal parameter may be calibrated. The calibration controller 214 may be further configured to calibrate a value of a second signal parameter based on a matching of the second signal parameter in the second receive path 308 relative to the second signal parameter in the first receive path 306.

At 528, a final signal may be generated based on the calibrated offset of the first signal parameter and the calibrated value of the second signal parameter. The one or more circuits 202 may be configured to generate the final signal with the calibrated offset of the first signal parameter and the calibrated value of the second signal parameter. The control passes to 530.

Figure 6:
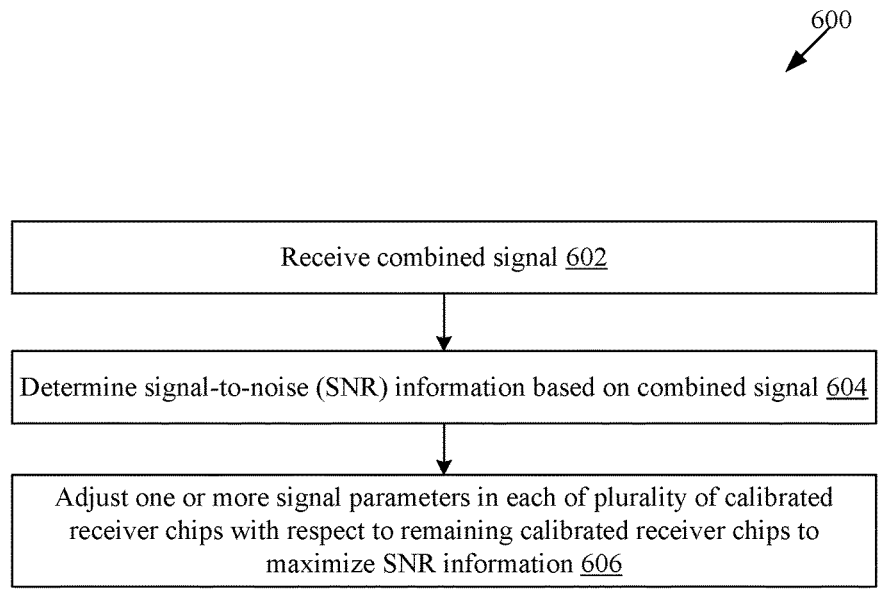
FIG. 6 depicts another flow chart illustrating calibration of signal parameters for a plurality of receiver chips, in accordance with an exemplary embodiment of the disclosure.

FIG. 6 depicts another flow chart illustrating calibration of signal parameters for a plurality of receiver chips, in accordance with an exemplary embodiment of the disclosure. Referring to FIG. 6, there is shown a flow chart 600 comprising exemplary operations 602 through 606.

At 602, a combined signal from a combiner circuit may be received. One or more circuits in the BB chip 330 included in the communication device 102 may be configured to receive a combined signal from the combiner circuit 328. The combiner circuit 328 may be configured to generate the combined signal based on a combination of a plurality of final signals generated by the plurality of calibrated receiver chips. Each of the plurality of calibrated receiver chips may be configured to generate corresponding final signal based on a calibrated offset of a first signal parameter and a calibrated value of a second signal parameter.

At 604, an SNR information may be determined based on the combined signal. The one or more circuits in the BB chip 330 may be configured to determine the SNR information. The one or more circuits in the BB chip 330 may be further configured to determine an offset between at least two of the plurality of calibrated receiver chips based on the determined SNR information. The BB chip 330 may select at least two of the plurality of calibrated receiver chips based on a round-robin criteria.

At 606, one or more signal parameters in each of the plurality of calibrated receiver chips may be adjusted with respect to remaining calibrated receiver chips to maximize the SNR information. The one or more circuits in the BB chip 330 may be configured to adjust the one or more signal parameters, such as amplitude gain and phase value, in each of the plurality of calibrated receiver chips with respect to remaining calibrated receiver chips to maximize the SNR information. In accordance with an embodiment, the SNR may be maximized when the one or more signal parameters match with each other.

Various embodiments of the disclosure may provide a non-transitory computer-readable medium having stored thereon, computer implemented instruction that when executed by one or more circuits causes a calibration system to execute operations to receive a plurality of receive signals. The first receive path 306 and the second receive path 308 are selected for the first receive signal 302 and the second receive signal 304, respectively. A first signal parameter of the second receive signal 304 is adjusted relative to the first signal parameter of the first receive signal 302 to maximize a first signal strength value of an added signal or minimize a second signal strength value of a subtracted signal. Based on the adjusted first signal parameter, an offset of the first signal parameter is calibrated. Further, based on a matching of the second signal parameter in the second receive path 308 relative to the second signal parameter in the first receive path 306, value of the second signal parameter is calibrated.

While various embodiments described in the present disclosure have been described above, it should be understood that they have been presented by way of example, and not limitation. It is to be understood that various changes in form and detail can be made therein without departing from the scope of the present disclosure. In addition to using hardware (e.g., within or coupled to a hardware processor such as a central processing unit ("CPU"), microprocessor, micro controller, digital signal processor, processor core, system on chip ("SOC") or any other device), implementations may also be embodied in software (e.g. computer readable code, program code, and/or instructions disposed in any form, such as source, object or machine language) disposed for example in a non-transitory computer-readable medium configured to store the software. Such software can enable, for example, the function, fabrication, modeling, simulation, description and/or testing of the apparatus and methods describe herein. For example, this can be accomplished through the use of general program languages (e.g., C, C++), hardware description languages (HDL) including Verilog HDL, VHDL, and so on, or other available programs. Such software can be disposed in any known non-transitory computer-readable medium, such as semiconductor, magnetic disc, or optical disc (e.g., CD-ROM, DVD-ROM, etc.). The software can also be disposed as computer data embodied in a non-transitory computer-readable transmission medium (e.g., solid state memory any other non-transitory medium including digital, optical, analogue-based medium, such as removable storage media). Embodiments of the present disclosure may include methods of providing the apparatus described herein by providing software describing the apparatus and subsequently transmitting the software as a computer data signal over a communication network including the internet and intranets.

It is to be further understood that the system described herein may be included in a semiconductor intellectual property core, such as a microprocessor core (e.g., embodied in HDL) and transformed to hardware in the production of integrated circuits. Additionally, the system described herein may be embodied as a combination of hardware and software. Thus, the present disclosure should not be limited by any of the above-described exemplary embodiments, but should be defined only in accordance with the following claims and their equivalents.

What is claimed is:

1. A calibration system, comprising:
    an antenna array;
    a receiver chip; and
    one or more circuits in the receiver chip, wherein the one or more circuits are programmed with instructions to:
        receive a plurality of receive signals at a plurality of input interfaces of a plurality of receive paths;
        select, from the plurality of receive paths within the receiver chip, a first receive path for a first receive signal and a second receive path for a second receive signal, wherein the plurality of receive paths are associated with a plurality of antenna elements of the antenna array;
        adjust a first signal parameter of the second receive signal relative to the first signal parameter of the first receive signal to maximize a first signal strength value of an added signal or minimize a second signal strength value of a subtracted signal;
        calibrate an offset of the first signal parameter based on the adjusted first signal parameter in the second receive path; and
        calibrate a value of a second signal parameter based on a matching of the second signal parameter in the second receive path relative to the second signal parameter in the first receive path.

2. The calibration system according to claim 1, wherein the selection of the first receive path and the second receive path is based on adjacency criteria.

3. The calibration system according to claim 1, wherein the selection of the first receive path and the second receive path is based on a round-robin criteria.

4. The calibration system according to claim 1, wherein the adjustment of the first signal parameter of the second receive signal is independent of the value of the second signal parameter.

5. The calibration system according to claim 1, wherein the one or more circuits in the receiver chip are further configured to generate a final signal based on the calibrated offset of the first signal parameter and the calibrated value of the second signal parameter.

6. A calibration system, the calibration system comprising:
- an antenna array;
- a transmitter chip;
- one or more first circuits in the transmitter chip, wherein the one or more first circuits are programmed with instructions to:
  - select, from a plurality of transmit paths within the transmitter chip, a first transmit path for a first transmit signal and a second transmit path for a second transmit signal, wherein the plurality of transmit paths are associated with a plurality of antenna elements of the antenna array;
  - adjust a first signal parameter of the second transmit signal relative to the first signal parameter of the first transmit path to maximize a first signal strength value of a first added signal or minimize a second signal strength value of a first subtracted signal;
  - calibrate a first offset of the first signal parameter based on the adjusted first signal parameter in the second transmit path; and
  - calibrate a first value of a second signal parameter based on a match of the second signal parameter in the second transmit path relative to the second signal parameter in the first transmit path; and
- a receiver chip;
- one or more second circuits in the receiver chip, wherein the one or more second circuits are programmed with instructions to:
  - receive a plurality of receive signals at a plurality of input interfaces of a plurality of receive paths;
  - select, from the plurality of receive paths within the receiver chip, a first receive path for a first receive signal and a second receive path for a second receive signal, wherein the plurality of receive paths are associated with the plurality of antenna elements of the antenna array;
  - adjust a third signal parameter of the second receive signal relative to the third signal parameter of the first receive signal to maximize a third signal strength value of a second added signal or minimize a fourth signal strength value of a second subtracted signal;
  - calibrate a second offset of the third signal parameter based on the adjusted third signal parameter in the second receive path; and
  - calibrate a second value of a fourth signal parameter based on a match of the fourth signal parameter in the second receive path relative to the fourth signal parameter in the first receive path.

7. The calibration system according to claim 6, wherein the selection of the first transmit path, and the second transmit path, and the selection of the first receive path, and the second receive path are based on adjacency criteria.

8. The calibration system according to claim 6, wherein the selection of the first transmit path, and the second transmit path, and the selection of the first receive path, and the second receive path are based on a round-robin criteria.

9. A calibration system, comprising:
- one or more circuits in a baseband chip, wherein the one or more circuits are programmed with instructions to:
  - receive a combined signal from a combiner circuit, wherein the combined signal corresponds to combination of a plurality of final signals generated by a plurality of calibrated receiver chips, wherein each of the plurality of final signals is generated by a corresponding calibrated receiver chip of the plurality of calibrated receiver chips based on a calibrated offset of a first signal parameter and a calibrated value of a second signal parameter;
  - determine a signal-to-noise (SNR) information based on the combined signal; and
  - adjust one or more signal parameters in each of the plurality of calibrated receiver chips with respect to at least one of remaining calibrated receiver chips to maximize the SNR information.

10. The calibration system according to claim 9, wherein the one or more circuits in the baseband chip are further configured to determine an offset between at least two of the plurality of calibrated receiver chips based on the determined SNR information, wherein the at least two of the plurality of calibrated receiver chips are selected based on a round-robin criteria.

11. A non-transitory computer-readable medium having stored thereon, computer executable instruction that when executed by a computer, cause the computer to execute instructions, the instructions comprising:
- in a receiver chip:
  - receiving a plurality of receive signals at a plurality of input interfaces of a plurality of receive paths;
  - selecting, from the plurality of receive paths within the receiver chip, a first receive path for a first receive signal and a second receive path for a second receive signal, wherein the plurality of receive paths are associated with a plurality of antenna elements of an antenna array;
  - adjusting a first signal parameter of the second receive signal relative to the first signal parameter of the first receive signal to maximize a first signal strength value of an added signal or minimize a second signal strength value of a subtracted signal;
  - calibrating an offset of the first signal parameter based on the adjusted first signal parameter in the second receive path; and
  - calibrating a value of a second signal parameter based on a matching of the second signal parameter in the second receive path relative to the second signal parameter in the first receive path.

12. A method, comprising:
- in a receiver chip including one or more circuits, wherein the one or more circuits are programmed with instructions for:
  - receiving a plurality of receive signals at a plurality of input interfaces of a plurality of receive paths;
  - selecting, from the plurality of receive paths within the receiver chip, a first receive path for a first receive signal and a second receive path for a second receive signal, wherein the plurality of receive paths are associated with a plurality of antenna elements of an antenna array;
  - adjusting a first signal parameter of the second receive signal relative to the first signal parameter of the first receive signal to maximize a first signal strength value of an added signal or minimize a second signal strength value of a subtracted signal;
  - calibrating an offset of the first signal parameter based on the adjusted first signal parameter in the second receive path; and
  - calibrating a value of a second signal parameter based on a matching of the second signal parameter in the second receive path relative to the second signal parameter in the first receive path.

13. The method according to claim 12, wherein the selection of the first receive path and the second receive path is based on adjacency criteria.

14. The method according to claim 12, wherein the selection of the first receive path and the second receive path is based on a round-robin criteria.

15. The method according to claim 12, wherein the adjustment of the first signal parameter of the second receive signal is independent of the value of the second signal parameter.

16. The method according to claim 12, wherein the one or more circuits in the receiver chip are further configured to generate a final signal based on the calibrated offset of the first signal parameter and the calibrated value of the second signal parameter.

\* \* \* \* \*